US006219267B1

(12) United States Patent
Andres

(10) Patent No.: US 6,219,267 B1
(45) Date of Patent: Apr. 17, 2001

(54) ELECTRIC SUPPLY SYSTEM, CORRESPONDING TERMINAL AND MOUNTING BASE

(76) Inventor: Jacques Andres, 6, Place de la République, 92300 Levallois-Perret (FR)

( * ) Notice: Subject to any disclaimer, the term of this patent is extended or adjusted under 35 U.S.C. 154(b) by 0 days.

(21) Appl. No.: 09/319,073

(22) PCT Filed: Dec. 2, 1997

(86) PCT No.: PCT/FR97/02177

§ 371 Date: Jul. 22, 1999

§ 102(e) Date: Jul. 22, 1999

(87) PCT Pub. No.: WO98/27561

PCT Pub. Date: Jun. 25, 1998

(30) Foreign Application Priority Data

Dec. 3, 1996 (FR) .................................................. 96 15054
Dec. 1, 1997 (FR) .................................................. 97 15068

(51) Int. Cl.[7] .............................. H02M 1/00; H02B 1/10
(52) U.S. Cl. ............................................ 363/146; 361/623
(58) Field of Search .................................... 363/144, 146; 323/355, 359; 361/600–603, 622, 623, 641, 643, 678, 690, 692, 707, 723, 733

(56) References Cited

U.S. PATENT DOCUMENTS 1,505,325 8/1924 Elbert .
3,271,710 9/1966 Leonard .
5,428,521 6/1995 Kigawa et al. .
5,751,542 * 5/1998 Holhammar .......................... 361/623

FOREIGN PATENT DOCUMENTS 35 03 348 6/1986 (DE) .
37 20 164 12/1987 (DE) .
38 02 661 8/1989 (DE) .
43 44 071 7/1995 (DE) .
0 358 470 3/1990 (EP) .
0357 829 3/1990 (EP) .
2 274 147 1/1976 (FR) .
1094578 12/1967 (GB) .
56-153713 11/1981 (JP) .
WO 94/28560 12/1994 (WO) .

OTHER PUBLICATIONS

W.T. McLyman, "Flux Coupling For Wheelchair Battery Chargers, Mobile Units Plug In Magnetically Instead of Electrically", Oct. 1985, NTIS Tech Notes NR. 10, Part B, p. 1171 XP002037625.

* cited by examiner

*Primary Examiner*—Matthew Nguyen
(74) *Attorney, Agent, or Firm*—Young & Thompson

(57) ABSTRACT

A contactless connecting system based on power transmission by induction includes an embedded transmitting part flush with ground level and a receiving part which is placed above it. The invention provides the possibility of supplying any standard electrical appliance once it is connected to the terminal; the standardization of the terminals which can be set on any contact block and receive power after recognition; the tightness of the embedded part; the safety provided for the electric power supply; and the continuous adaptation of the power supply to the variations in the load (the regulating algorithm is contained in a non-volatile memory). The dialogue established between the transmitting part and the receiving part enables the recognition of the type of terminal and the remote transmission of information for invoicing, remote monitoring, etc.

16 Claims, 4 Drawing Sheets

ELECTRIC SUPPLY SYSTEM, CORRESPONDING TERMINAL AND MOUNTING BASE

BACKGROUND OF THE INVENTION

The field of the invention is that of supplying electrical energy, for a load of unknown value, without mechanical contact, in particular outdoors and in public places.

Electrical energy from a public or private mains supply is currently made available through a simple connection medium in the form of a socket outlet. This medium has many advantages, the main one of which is the very low acquisition cost for the user.

Nevertheless, this medium has major drawbacks, the main ones of which can be summarised as follows:

- different standards in different countries often make the various kinds of male and female connector incompatible,
- any socket outlet supplying energy must protect its conductors by means of mechanical components,
- the safety of the user must be assured regardless of defects of the installation (differential circuit-breaker), and
- the mechanical connection is subject to all kinds of hazards (water, oxidation, poor contact, etc).

In other words, the socket outlet is perfectly suitable for most purposes but inevitably gives rise to problems under some conditions of use. This is the case in particular with socket outlets installed outdoors, in particular buried ones, which have to work in severe surroundings due to their environment and the climatic conditions to which they are exposed: coastal atmosphere, dust, rain, violent storms, etc., and even vandalism in the case of outlets in public places.

Communities are becoming concerned about the use of buried outlets for connecting to the EDF mains supply in public places, because of the maintenance costs that they generate. The solution that entails placing them in boxes above ground contributes to cluttering public places and thoroughfares with street furniture. Electrical power distribution cabinets and terminals for various uses (payment, security, lighting, telecommunications, etc.) are continually “sprouting”. The profusion and diversity of these outdoor “boxes” and the works and costs to which they give rise are worrying local councillors.

For any community, a good electrical energy distribution system is one which is unseen, which does not clutter the environment and which is available without specialist intervention. Councillors are currently in favour of solutions which make the consumer pay the costs.

In the field of electrical energy distribution terminals, the use benefits the user, but the residents have to put up with the cluttered environment.

The erection of fixed terminals which divide marketplaces into a grid makes it difficult to convert the area for other local events. Access to energy is also highly localised, with a procedure for opening or closing all of the mains supply to the platform.

Multiple uses are encountered with multiple electrical mains supplies. Thus electric cars use their own mains supply on the public thoroughfare, municipal services their dedicated outlets. Other outlets are used for public utility services and by street sellers for their scales and heating appliances.

Another aspect is that access to the electrical mains supply, in France in particular, is not valued. For 50 years the French have been consuming electricity without concerning themselves with the mains supply that delivers it. Electricity has been “on offer”, so to speak. With the same mind-set, communities are reluctant to invest in a “public” socket outlet, even a buried one. For the end user the price must be low, and the means for supplying energy are of no interest provided that energy is available.

Availability is the main quality required of buried electricity distribution terminals. This continuous operation constraint leads to high maintenance costs for buried outlets, which are exposed to all the hazards of the thoroughfare. Initial trials indicate annual costs of 70,000 to 80,000 francs per 100 terminals and that faults are often of mechanical origin or associated with the ingress of rainwater or cleaning water.

The cost can be significantly reduced with installations that have no moving parts.

Also, issuing a VAT-inclusive invoice for electricity in small amounts (17.25 francs, for example) is not universally acceptable and does nothing to simplify accounting procedures. From this point of view, self-service access would simplify the relationship between the end user and the supplier of energy through prepayment, eliminating the need for authorisation and specialist personnel for making the connection.

The technologies employed at present are essentially electromechanical for which preventive maintenance is not enough. They must resist the severe conditions of their environment. Cleaning with high-pressure water jets drives rubbish and mud into the wells and socket outlets.

A lock which sticks, a valve that fails to close, rough handling, these are all causes of faults associated with the condition of retraction of the socket outlets and access to them via a trapdoor.

SUMMARY OF THE INVENTION

One objective of the invention is to overcome the above drawbacks of the prior art.

One objective of the invention is to eliminate the mechanical connection interface and to insulate the exterior of the electrical mains supply permanently by making the connection by means of a simple foolproof action, such as putting one object on top of another.

The above objectives are achieved, in accordance with the present invention, by transmitting current by induction to energise one or more electrical socket outlets to which users connect their personal installations.

The invention has a number of novel aspects. They are directed in particular to natural protection of the environment from radiation, an enclosure that offers the expected guarantee of ruggedness, the possibility of transmitting digital data to and receiving it from the mains supply, etc. Extension to derived applications is also proposed.

To be more precise, the invention concerns a system for supplying electrical energy, in particular outdoors and in public places, comprising:

- a part called the base which is buried and/or embedded in a wall, comprising a first induction coil energised by an electrical mains supply. The base is energised from the mains supply with a single-phase current or preferably, because of the power transmitted, a three-phase current, generally at 50 or 60 Hz and 230 volts (depending on the country concerned); this frequency is stepped up by an electronic stage functioning as a resonant inverter which uses IGBT components to provide a current chopped at a frequency of approximately 20 kHz or more. The resulting current is delivered to the induction coil at a voltage of approximately 350 V via a cable.

The induction coil is in the form of a plate approximately 22.5 cm in diameter housing six concentric turns. Each turn is the result of braiding almost 1,000 insulated wires each having a diameter of 0.18 mm. The first coil has an intermediate output, enabling transmission of only part of the power, and a mobile part, called a terminal, comprising a second induction coil supplying at least one socket outlet and designed to be placed opposite said base to enable inductive coupling between said first and second coils so that electrical energy received from said electrical mains supply can be transmitted to said socket outlet(s) with no electrical connection between said base and said terminal. The electronics of the mobile part rectify a 350 V current picked up by the receiver plate which is converted to a 230 V alternating current by a conventional inverter stage to supply approximately 4 to 6 kW of power.

Said base advantageously comprises a sealed enclosure of which at least the part opposite said terminal is made from a non-magnetic material.

Said magnetic material preferably comprises ferrite, at least one rare earth or a mixture of those materials.

Said magnetic material comprises ferrite, for example, at least one rare earth (cobalt) or a mixture of those materials.

Said base advantageously comprises first electronic means assuring at least one of the functions belonging to the group comprising:

- converting a low-frequency electrical signal received via said electrical mains supply into a high-frequency electrical signal feeding said first coil;
- detecting the presence of and/or identifying said terminal. The optimum efficiency of the system is conditioned by a concentric disposition of two plates placed one on the other. To obtain this result the centre of the sender and receiver plate has a 3 cm diameter hole in it. This hole contains a ring magnet which forms a force-fit ring. The intensity of the magnetic field detected when the two magnets interact with each other triggers or does not trigger, depending on the setting, the operation of the optical interface of the communication receiver described below and consequent emission of an inductive field from the coil of the buried base to the receiver coil. Another possibility is to use the intermediate output of the coil of the base; energising only this source coil part generates a low power just sufficient to establish communication with the mobile part. When the mobile part is recognised, following an exchange of information between the stud and the terminal, a mechanical contact or one with no moving parts connects the remainder of the source coil and all of the power is transmitted.
- validation of transfer of energy between said coils.
- limitation of the transmitted power. This limitation is effected by a regulation algorithm programmed in a REPROM enabling the buried electronics to react to varying calls for power from the terminal.

For currents above an inrush current of 32 amperes lasting 200 milliseconds, detected by the mobile terminal and transmitted to the buried electronics by the communication link from the terminal to the buried electronics, the sender system goes to a self-protection mode by means of a circuit-breaker relay.

This accidental interruption of the power supply automatically opens the circuit-breaker of the mobile terminal. The sender system is reset automatically after a particular time-delay. To restart the mobile terminal the user must reset the circuit-breaker on it manually and repeat the general procedure for starting up the system.

- transfer of data to a centralised device, for example by modulating a power line carrier current. This can allow centralised billing for the supply of current, for example.

Said terminal preferably comprises electronic means converting a high-frequency electrical signal received by said second coil into a low-frequency electrical signal feeding said socket outlet(s).

Said terminal advantageously comprises at least one of the elements belonging to the group comprising:

- an indicator to indicate that energy is being transferred,
- at least one electrical socket outlet to a known standard,
- a reader for a portable memory device for authorising use of said terminal and/or paying for electrical energy consumed,
- dedicated electrical equipment, such as a lamp on a pole, an illuminated cone, emergency equipment, and
- at least one carrying handle.

In accordance with another advantageous feature, the system of the invention comprises means for encouraging and/or monitoring alignment of said terminal with said base, belonging to the group comprising:

- mechanical guide means for placing said terminal on and/or attaching it to said base, and
- optical means transmitting an optical signal in the visible or invisible spectrum, for example an infrared signal, from said terminal to a corresponding sensor in said base.

In order to transmit identification and regulation information from the terminal to the buried base without contact, an infrared optical emitter at the centre of the magnet in the ring of the plate of the mobile terminal transmits digital information to the infrared optical receiver at the centre of the magnet in the central ring of the plate of the buried base facing it. This bidirectional communication is continuous while the system is operating.

The system can equally comprise means for locking said terminal to said base and prohibiting the removal of said terminal while energy is being transferred. Said locking means advantageously employ magnetic forces.

The invention equally concerns the terminals and the bases of a system of the above kind.

BRIEF DESCRIPTION OF THE DRAWINGS

Other features and advantages of the invention will become more clearly apparent after reading the description of one preferred embodiment and referring to the accompanying drawings, in which.

DESCRIPTION OF PREFERRED EMBODIMENTS

Figure 4:
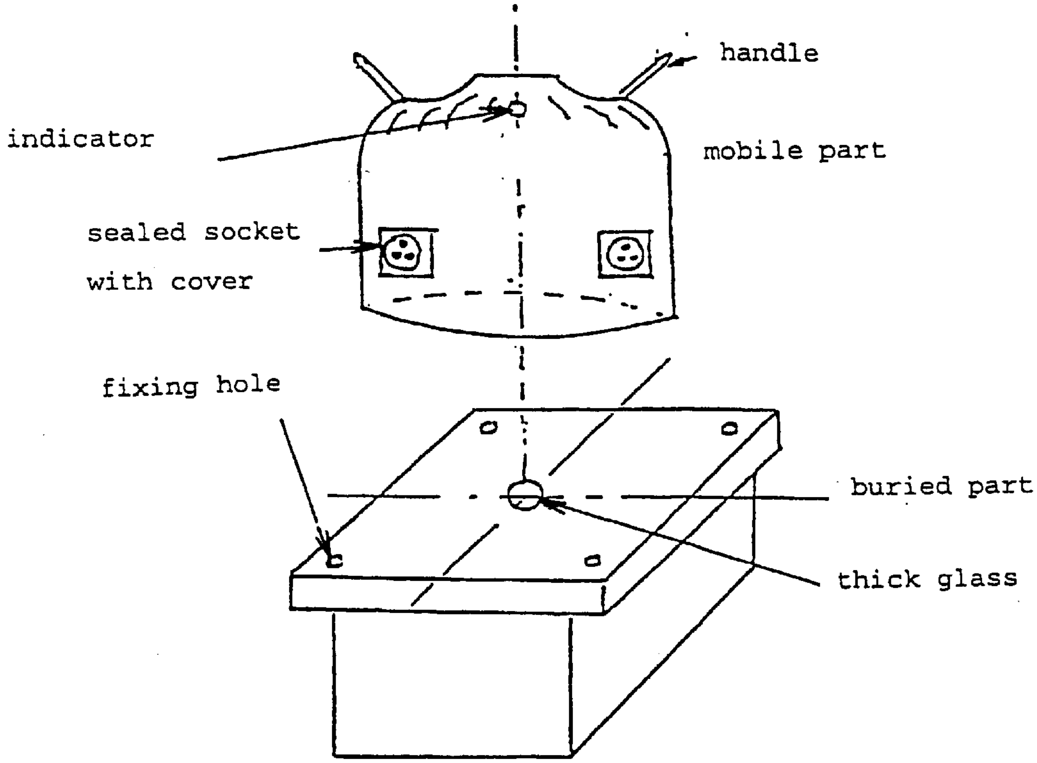
FIG. 4 is a perspective view of a different presentation of a base and a terminal in accordance with the invention.

The system of the invention comprises two totally separate and unlike elements (FIG. 4):

a base (see also FIG. 2) which is fixed at ground level and contains a source sender coil, and a portable terminal (see also FIG. 1) containing a receiver coil with onboard electronics and built-in electrical socket outlets, to which the user connects electrical equipment.

Figure 2:
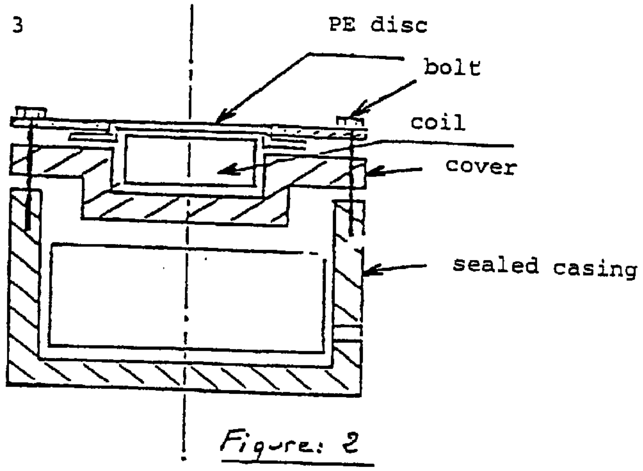
FIG. 2 shows a base in accordance with the invention in cross section, FIGS. 6 and 7 showing an industrial version of the same thing.

The base (FIG. 2)

The source sender coil is buried. Entirely without moving parts, it is housed in a sealed enclosure and is seen at ground level as a circular induction plate with a coating suitable for public places, in particular a discreet non-skid coating. The base rests on the ground. The combination emerges half a centimetre from the ground into which it is fixed. The one-piece assembly is housed in a dead well.

Being disposed at ground level, the bases are not a constraint limiting use of the platform to a single activity, and this expands its use to multiple purposes such as markets, local events and commercial or sporting events. Hardly noticeable to a standing person, they do not disfigure the location and are consistent with use in touristic sites.

All the bases can be used by anyone having a corresponding induction terminal. In the case of markets, the induction terminal is more like a standard multiple socket outlet. More generally, the user can obtain different services by placing receiver coils dedicated to multiple uses on the base, for example a lamp on a pole which provides illumination simply by being placed on a base, safety signalling for roads or illuminated signs using the array of bases as a grid.

The bases are inert subsystems that are simple and economical to install using appropriate tooling. Unlike the conventional buried outlet solution, in using the induction solution the investor has to finance directly only the infrastructure of the studs, because the terminals themselves are wholly or partly the responsibility of individual or collective customers.

The buried base is supplied in the form of a hollow concrete cube covered by a metal plate that is visible on the ground (see FIG. 7) and structural members on which facilitate centring the mobile terminal and encourage a flow of air for cooling the sender plate when it is covered by the mobile terminal. This cube houses the electronics module. It is sealed, installed in a well excavated for this purpose and connected to the electrical mains supply by a cable emerging from the cube.

Figure 7:
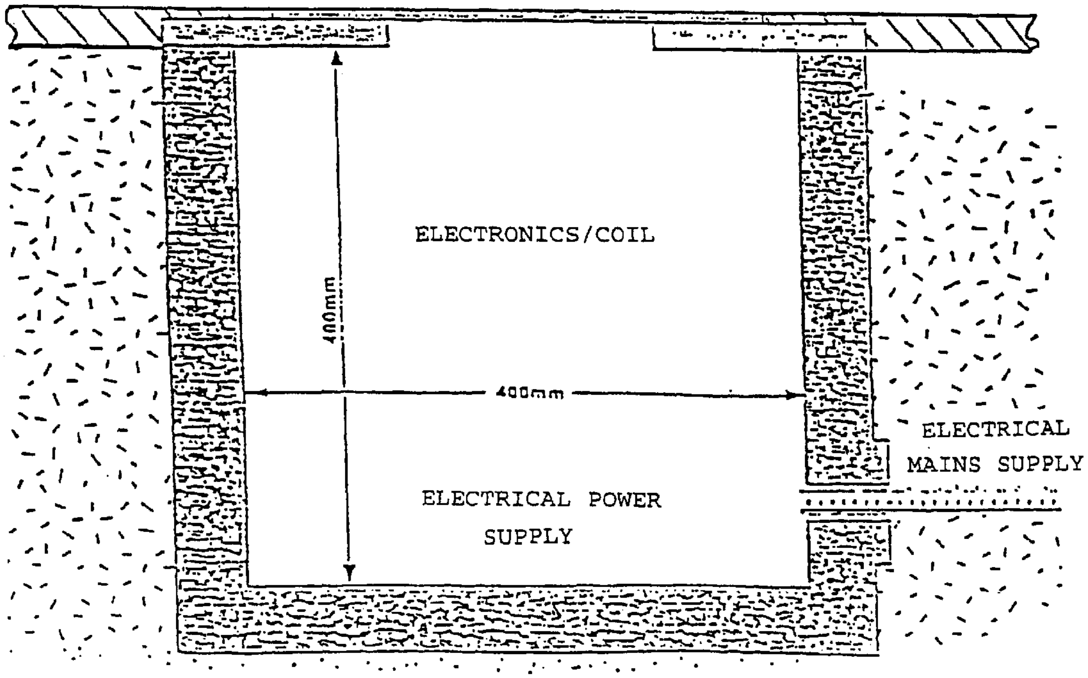

To provide an ambient temperature compatible with the electronics in the sealed enclosure, arrangements around the casing distribute and evacuate heat emitted by the internal electronics, in the manner of heatsinks fixed to power transistors (see FIG. 7). Special feature of the sender plate.

Figure 6:
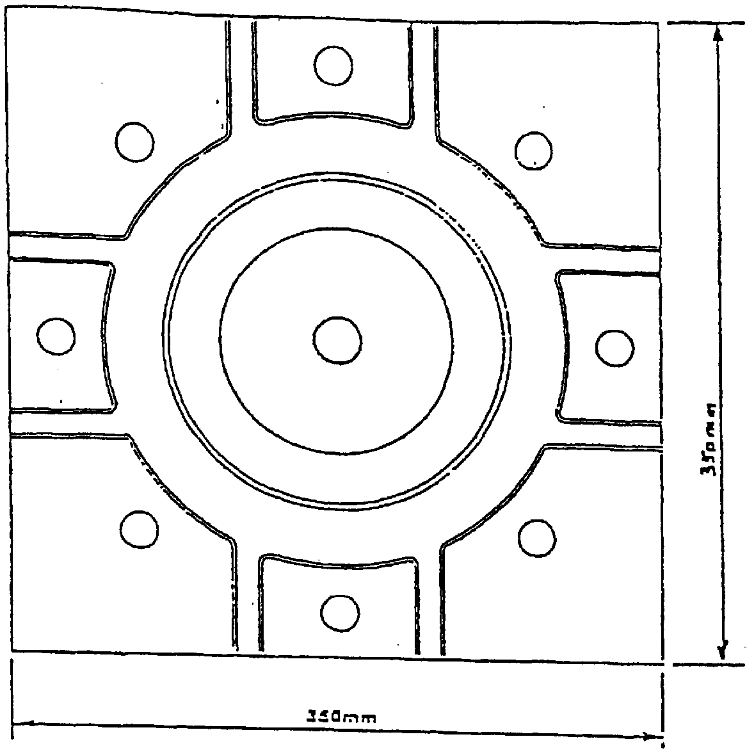

The circular sender plate visible on the ground is covered by a plastics material member (see FIG. 6) designed to assure effective protection of the plate and to retain its original shape without suffering deformation caused by the cumulative heating effect of the sun, the sender coil and the receiver coil of the terminal placed on it.

The protective part is the shape of an inverted plate whose edge is sandwiched between the metal plate visible on the ground and the concrete lid to which the plate is fixed.

Of itself, this system provides a seal for the sender plate between the public road and the buried base and makes repair or replacement a simple procedure, should it prove necessary.

The time needed to install the stud is short because installation is simple using appropriate tooling.

A plate on the ground is more resistant to the marine atmosphere of ports than conventional socket outlets, which are costly to maintain in such an environment.

Totally without moving parts, the stud does not require any particular maintenance. Its compact and sealed design resists the conditions of use of public platforms (street cleaning, vehicle wheels, etc.) and complies with safety constraints in respect of various sectors of the human and animal population. It is designed so that it can be activated only when a terminal incorporating a receiver coil is present, which makes it safe in operation.

The bases are marked out on the ground and the array of studs can of course be connected to a self-service electricity distribution terminal like those provided for electric vehicles. In this case maintenance of the electronic money terminal and the associated mains supply is significantly reduced because of the total absence of associated mechanical parts (the electronic money terminals in question have been proven already through many installations on roads and in car parks).

Figure 1:
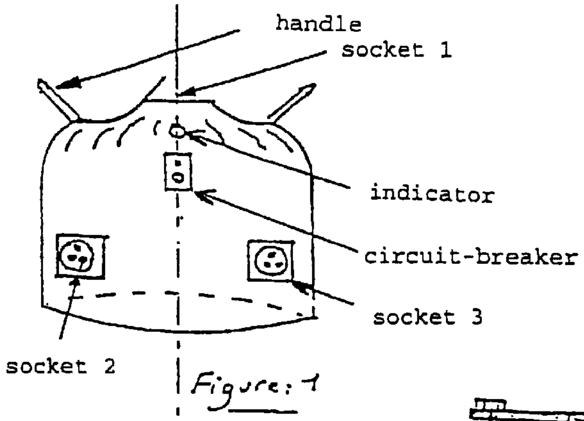
FIG. 1 shows a first embodiment of a terminal in accordance with the invention, FIG. 8 showing an industrial version of the same thing.

The terminal (portable induction socket outlet) (FIG. 1)

The portable terminal contains a receiver coil and a built-in electrical socket outlet in the case of applications in markets and for electrical energy distribution in general. Entirely without moving parts, it is housed in a sealed enclosure and is in the form of a cylindrical cover that is placed on top of the stud. It has two handles to facilitate transporting it and a plurality of protected socket outlets to supply electricity.

Covering an active stud, it adheres to the ground and cannot be moved while energy is being supplied. It “unsticks” automatically if the stud is no longer receiving current or in an emergency. It encloses the standard protection devices and has an emergency off switch that can be operated with the foot. It is made from materials which limit magnetic radiation in operation by channelling the radiation. It is provided with a system for transmitting information to the mains supply.

The mobile terminal is proportioned and designed to emphasise the carrying handle, to limit the distance that the terminal can be dropped while being transported, to make it easy to assemble and to make it impossible to disassemble without destroying it. What is wanted is a shape familiar to users and simplified ergonomics with no hint of electronics.

Figure 8:
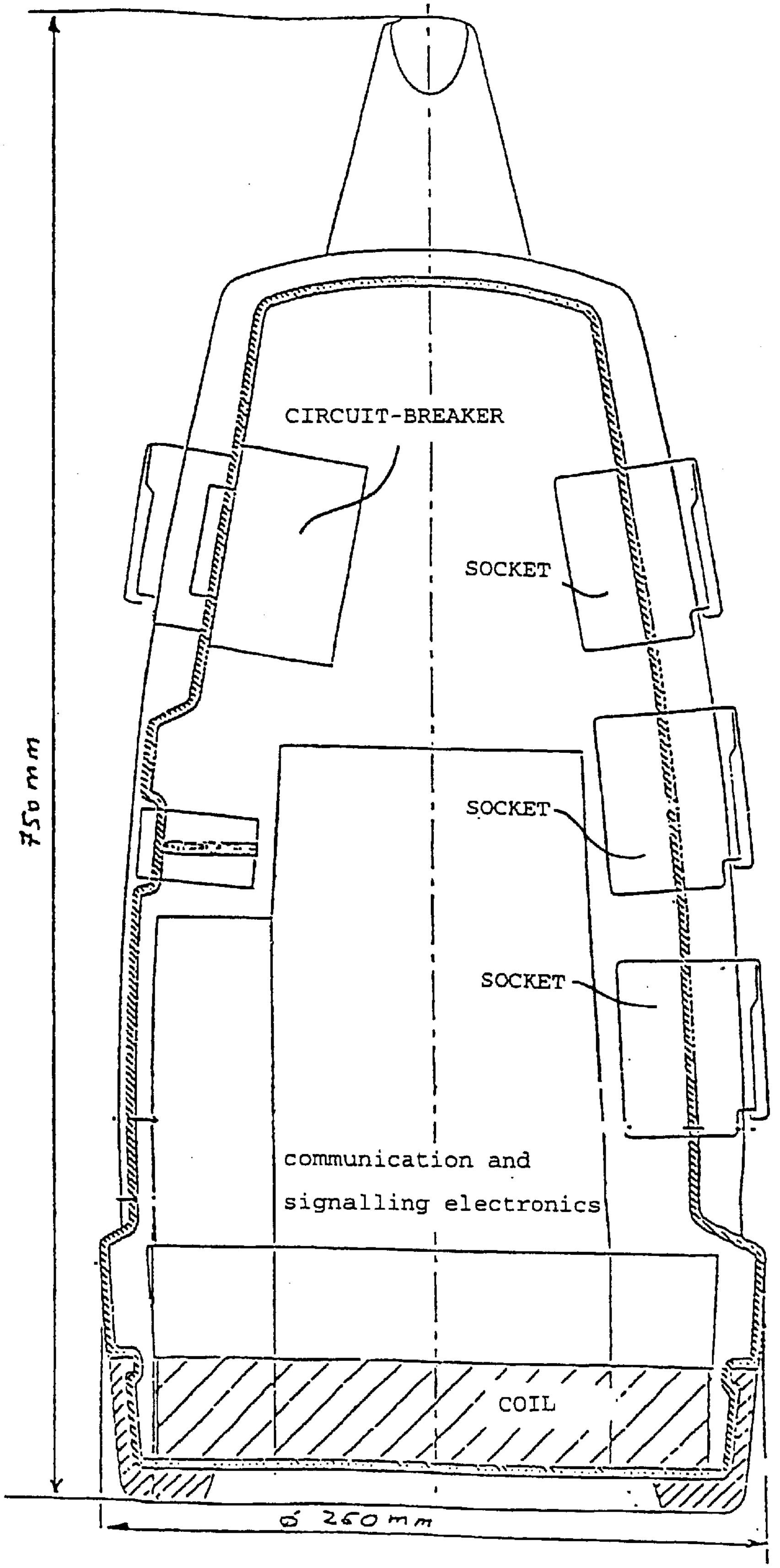

The terminal is shown in the accompanying FIG. 8.

During the assembly phase the mobile terminal comprises:

the receiver plate, to which the electronic boards and components are fixed on a square heatsink with a side length of 4 cm and a height of 10 cm with a bundle of socket outlet connecting cables (the combination is called the electronics module of the terminal), and the casing, to which the socket outlets and the control buttons and indicators are fixed.

The electronics module of the terminal is installed in the casing in a single operation, after its equipment has been connected by clipping the receiver plate into the rubber ring at the base of the casing. This operation can be reversed only with appropriate tooling.

Special tooling is provided for forcibly fitting the module into the terminal, which is assembled upside down.

The mobile terminal houses an inductive transmitter-receiver for reading and writing digital information from contactless cards to enable the user to start their terminal working and to pay for electricity using an electronic purse.

This electronic funds transfer system can be installed in each mobile terminal and is complementary to the modes of operation described hereinafter under the heading: Description of modes of operation.

The portable terminal is stored on users’ premises or by the management organisation. It is therefore out of sight when out of use.

There are many possible uses of the inductive connection. Three types of open air application are typical examples.

Domestic, heating, lighting or kitchen appliances can be fitted with an integral direct connection plug connector or connected to an induction socket outlet. In this case continuous self-service access to the EDF mains supply using public studs provided for all to use meets the prime need of campers and caravanners equipped with their own terminals: freedom of movement.

The possession of terminals by the emergency services gives them access to power wherever studs are provided.

Finally, this electrical solution eliminates the use of small motor-generator sets which are noisy and polluting.

The cost of acquisition of the socket outlet is independent of the mains supply infrastructure investment cost. This can provide local communities with multiple economic responses at low cost. There are several possible solutions:

They can invest only in the infrastructure, using private sector contractors to sell or rent the studs.

They can invest in the infrastructure and purchase some of the studs, individual users purchasing the remainder.

They can subcontract management of the system entirely to a private sector contractor.

etc.

Furthermore, by opting for a self-service solution, communities can associate payment and supply of electricity services, all the services being debited to the card until its credit has been used up.

Entirely without moving parts, the stud does not require any particular maintenance. Of compact and sealed design, it is designed to resist use by multiple users without particular storage precautions.

The stud conforms to safety constraints regarding different sectors of the population, in particular by allowing rapid disconnection in the event of a problem.

Transmission of digital information between the socket outlet, the stud and the mains supply can allow for personalised recognition of the user. Electronic access keys and even "master key" terminals for the emergency services can be programmed in this way.

This system is not maintenance-free but maintenance is significantly reduced and fast in an emergency. It does not concern the studs but only the connection to the mains supply. A stud that is inoperative does not require any intervention on site, merely replacement. One solution is to have one or more spare studs available on site for maintenance purposes.

Service exchange of terminals can be subcontracted to the contractor or a specialist maintenance company.

Figure 5:
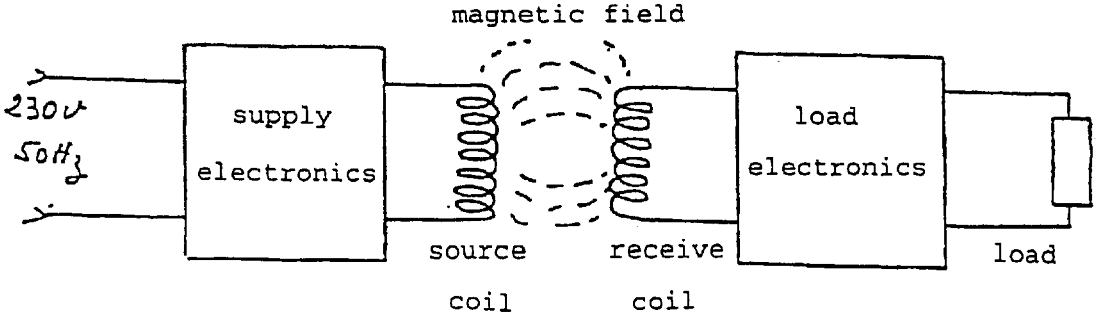
FIG. 5 illustrates the theory of the invention.

The general principle of the invention, which is known in itself, is based on the use of induction, as shown in FIG. 5.

Figure 3:
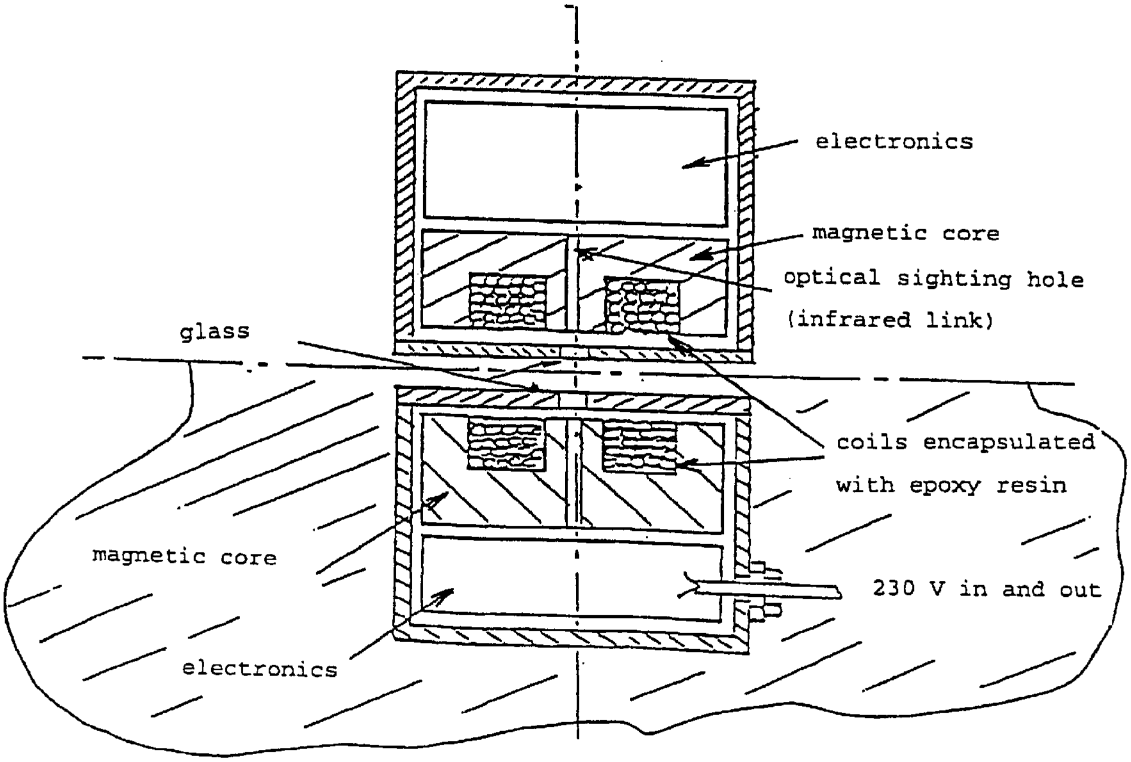
FIG. 3 is a more detailed view in cross section of the component of a system in accordance with the invention.

The system shown in FIG. 3 will now be described in more detail.

The invention therefore concerns the supply of electrical energy in public or private places, for example places exposed to outdoor atmospheric conditions and where a profusion of fixed street furniture is not required but where there is a temporary need for power (market days, holidays, lighting for street parties, etc.), at a low power, for example less than 10 kW.

The new contactless connection system is designed to replace existing electrical connections of the male-female connector type.

The system comprises:

a part buried in the ground (or possibly embedded in a wall), and a mobile part that is put on top of the buried part.

The buried part is the source of energy. It is installed in a concrete well to which the low-voltage electrical mains supply leads. Once connected to the mains supply, it is bolted to the ground. A seal beneath it prevents any infiltration of water. The system is designed for quick connection and replacement of the supply.

Its surface that can be seen at ground level is made of a non-magnetic non-skid material and carries appropriate markings. Its mechanical strength is consistent with the passage of an automobile over it.

The source comprises control electronics associated with an inductive coil disposed in a core of a ferrite or rare earth (cobalt, etc.) type magnetic material that creates the magnetic field. The advantage of this type of material is that it allows high levels of coupling with low losses combined with a directional magnetic field.

The control electronics have a number of roles:

converting the 220 V AC 50 Hz current into a high-frequency (HF) current feeding the coil, recognising and identifying a mobile part (validating a code), validating the transfer of energy, limiting the power transmitted (short-circuit, vandalism, etc.), transmitting information on a power line carrier current or via a bus to a centralised unit with management, diagnostic, metering, etc. functions.

The mobile part comprises:

a receiving coil with its magnetic core, control electronics for converting the HF signal received into a usable current/voltage, an indicator showing that energy is being transferred, conventional 16 A electrical socket outlets, a device for centring the terminal and mechanically or magnetically locking it relative to the source coil.

It can equally be provided with a card reader (or a reader for a similar portable object) for associating energy distribution and payment.

Its weight enables it to be carried by one person (less than 10 kg).

This mobile part can be dedicated to a particular function by providing it, for example, with a lamp on a pole, an illuminated safety cone, emergency electrical equipment, etc.

What is claimed is:

1. A system for supplying electrical energy, comprising:

a fixed base comprising a first sender induction coil energized by an electrical mains supply, and a mobile terminal comprising a second receiver induction coil supplying at least one socket outlet and designed to be placed opposite said base to enable inductive coupling between said first and second coils so that electrical energy received from the electrical mains supply can be transmitted to said at least one socket outlet with no electrical connection between said base and said terminal, wherein said base comprises first electronic means assuring at least one of the functions belonging to the group consisting of, converting a low-frequency electrical signal received via the electrical mains supply, the frequency being stepped up by an electronics stage assuring the function of a resonant inverter using two IGBT components to produce a high-frequency electrical signal energizing the sender induction coil of the base at an upper voltage, said sender coil being in the form of a sender plate housing concentric turns, detecting correct positioning and the presence of and/or identifying said terminal, the optimum efficiency of the system being conditioned by a concentric arrangement of the sender plate and of a receiver plate of said terminal placed one on the other, said sender and receiver plates having for this purpose a centering hole, said sender coil has an intermediate output energizing only a part of the sender coil for generating a low power just sufficient to establish a communication with said mobile receiver part so as when the mobile part is recognized, after an exchange of information between the base and the terminal, contact means connect the remainder of the sender coil to the receiver coil and all the power is transmitted, and validation of transfer of energy between said coils.

2. The system according to claim 1, wherein said base comprises a sealed enclosure of which at least the part opposite said terminal is made from a non-magnetic material.

3. The system according to claim 1, wherein the buried base is supplied in the form of a hollow concrete cube covered with a metal plate on the ground and on which structural members facilitate centering the mobile terminal and encourage circulation of air to cool the sender plate when the latter is covered by the mobile terminal and, to assure an ambient temperature compatible with the electronics in the sealed enclosure, a device around the electronics module for distributing and removing heat emitted by the internal electronics in the manner of heatsinks fixed to power transistors.

4. The system according to claim 1, wherein the circular sender plate visible on the ground is covered by a plastics material member designed to provide effective protection of the plate and to retain its original shape without deformation caused by the cumulative heating effect of the sun, the sender coil and the receiver coil of the terminal placed on it, in that the protective part is the shape of an inverted plate whose edge is sandwiched between the metal plate visible on the ground and the concrete cover to which that plate is fixed, and in that the system itself assures a seal for the sender plate between the public road and the buried base and allows simple service exchange repair, if necessary.

5. The system according to claim 1, wherein said first coil and/or said second coil are placed in the magnetic material core.

6. The system according to claim 5, wherein said magnetic material comprises ferrite, at least one rare earth or a mixture of those materials.

7. The system according to claim 1, wherein said terminal comprises second electronic means which rectify the high-frequency electrical signal received by the receiver coil at 350 volts and convert it using a conventional inverter stage into a low-frequency electrical signal for energizing said socket outlet(s) to supply power in the range from 4 to 6 kW.

8. The system according to claim 1, wherein said terminal comprises at least one of the items belonging to the group consisting of, an indicator showing that energy is being transferred, at least one electrical socket outlet to one or more known standards, a device for reading portable memory objects for authorizing use of said terminals and/or paying for electrical energy consumed, dedicated electrical equipment, such as a lamp on a pole, an illuminated cone, emergency equipment, and at least one carrying handle.

9. The system according to claim 1, further comprising means for encouraging and/or controlling aligning said terminal with said base, belonging to the group consisting of, mechanical guide means for placing said terminal on and/or attaching it to said base, and optical means for transmitting an optical infrared signal from said terminal to a corresponding sensor in said base.

10. The system according to claim 1, further comprising means for locking said terminal to said base and preventing removal of said terminal while energy is being transferred.

11. The system according to claim 10, wherein said locking means employ magnetic forces.

12. The system according to claim 1, wherein a ring magnet is inserted in each hole of said sender and receiver plates, the intensity of the magnetic field detected due to interaction of the two magnets with each other triggering the operation of an optical interface of a communication receiver and consequent effective transmission of an inductive field from the coil of the buried base to the receiver coil.

13. The system according to claim 12, wherein for said validation of transfer of energy between said coils, in order to transmit identification and regulation information from the terminal to the buried base without contact, an infrared optical emitter at the center of the magnet in the ring of the plate of the mobile terminal transmits digital information to an infrared optical receiver at the center of the magnet in the central ring of the plate of the buried base opposite it, and in that said bi-directional communication is continuous while the system is operating.

14. The system according to claim 1, for supplying electrical energy to a variable and unknown load further comprising means of limitation of the power transmitted by placing the sender base on an auto-protection state beyond a predetermined power value detected by the mobile terminal and transmitted to the electronics of the base via the communication and means of automatic resetting of said limitation means after a time-delay.

15. The system according to claim 1, further comprising data transferring means to a centralized device.

16. The system according to claim 15, wherein said data is transferred by modulating a power line carrier current.

* * * * *